(12) United States Patent
Fletcher

(10) Patent No.: US 10,974,156 B2
(45) Date of Patent: Apr. 13, 2021

(54) FRICTIONAL AND SWEAT ABSORBING VIDEO GAME CONTROLLER SLEEVE

(71) Applicant: Cherri Ann Fletcher, Central Point, OR (US)

(72) Inventor: Cherri Ann Fletcher, Central Point, OR (US)

(*) Notice: Subject to any disclaimer, the term of this patent is extended or adjusted under 35 U.S.C. 154(b) by 0 days.

(21) Appl. No.: 16/416,149

(22) Filed: May 17, 2019

(65) Prior Publication Data

US 2019/0351336 A1 Nov. 21, 2019

Related U.S. Application Data

(60) Provisional application No. 62/672,912, filed on May 17, 2018.

(51) Int. Cl.
*A63F 13/00* (2014.01)
*A63F 13/98* (2014.01)

(52) U.S. Cl.
CPC .................................. *A63F 13/98* (2014.09)

(58) Field of Classification Search
CPC .......... G06F 3/016; A63F 13/24; A63F 13/98; A63F 13/20
See application file for complete search history.

(56) References Cited

U.S. PATENT DOCUMENTS

| | | | | |
|---|---|---|---|---|
| 2005/0275165 A1* | 12/2005 | Hussaini | ................. | A63F 13/06 273/148 B |
| 2008/0122173 A1* | 5/2008 | Harris | .................... | A63F 13/02 273/148 B |
| 2014/0141891 A1* | 5/2014 | Georgy | ................... | A63F 13/02 463/47 |

* cited by examiner

*Primary Examiner* — Omkar A Deodhar
*Assistant Examiner* — Eric M Thomas

(57) ABSTRACT

A frictional and sweat absorbent video game controller has a sleeve body and a controller cavity configured to receive a video game controller. A series of layers makes up the sleeve body, from an outer frictional layer to a waterproof inner layer, and including a medial cushioning layer. Sweat from a user's hands is absorbed into the sleeve body, thus hand slippage is reduced in combination with the outer frictional layer. Furthermore, the controller itself is protected from sweat contamination, and the user is provided a comfortable gripping surface to ensure the controller remains secure in the hands.

1 Claim, 3 Drawing Sheets

FRICTIONAL AND SWEAT ABSORBING VIDEO GAME CONTROLLER SLEEVE

The current application claims a priority to the U.S. Provisional Patent application Ser. No. 62/672,912 filed on May 17, 2018.

FIELD OF THE INVENTION

The present invention relates generally to video game accessories. More particularly, the present invention relates to video game controller covers.

BACKGROUND OF THE INVENTION

A video game is an electronic game that involves interaction with a user interface to generate visual feedback on a two- or three-dimensional video display device such as a TV screen, virtual reality headset or computer monitor. Since the 1980s, video games have become an increasingly important part of the entertainment industry, and whether they are also a form of art is a matter of dispute.

The electronic systems used to play video games are called platforms. Video games are developed and released for one or several platforms and may not be available on others. Specialized platforms such as arcade games, which present the game in a large, typically coin-operated chassis, were common in the 1980s in video arcades, but declined in popularity as other, more affordable platforms became available. These include dedicated devices such as video game consoles, as well as general-purpose computers like a laptop, desktop or handheld computing devices.

Players view the game on a display device such as a television or computer monitor or sometimes on virtual reality head-mounted display goggles. There are often game sound effects, music and voice actor lines which come from loudspeakers or headphones. Some games in the 2000s include haptic, vibration-creating effects, force feedback peripherals and virtual reality headsets. The input device used for games, the game controller, varies across platforms. Common controllers include gamepads, joysticks, mouse devices, keyboards, the touchscreens of mobile devices, or even a person's body, using a Kinect sensor.

While using a video game controller, a user's hands may begin to sweat and accumulate moisture after an extended period of time. The user may also experience cramping in their hands from gripping the hard plastic exterior of the controller. As such, the controller may slip within the user's hands, reducing their ability to competently play the game.

It is therefore an objective of the present invention to present a frictional, sweat-absorbent cover for video game controllers which reduces or eliminates undesired effects due to sweating and provides a comfortable gripping surface to the user.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention provides users with a multi-layer gripping sleeve for video game controllers designed to provide comfort and moisture absorption while playing video games. The present invention fits snugly around multiple types of video game controllers, allowing sweat and other moisture to be absorbed during gameplay and preventing controllers from becoming wet and unsanitary when playing games for extended period of time. Furthermore, the present invention reduces friction and slippage while playing intense games, ensuring the controller remains securely in the user's hand. The present invention may be disposable, so that the sleeve may be replaced if a significant amount of sweat is absorbed into the present invention, causing discoloration, unpleasant odor, or other undesirable effects. The present invention may be referred to in some instances as "Cherry Grips." There is intended to be no limit for sizes and styles of grips created. Exact size, measurement, construction, and design specifications may vary upon manufacturing.

Figure 1:
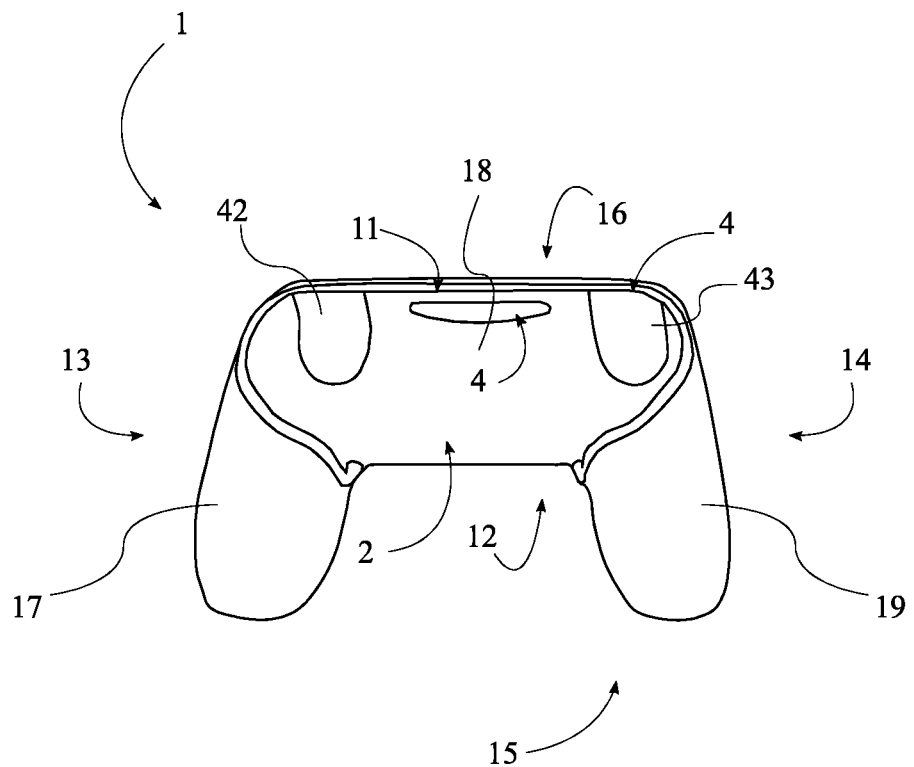
FIG. 1 is a top view of the present invention in accordance with some embodiments.
Figure 2:
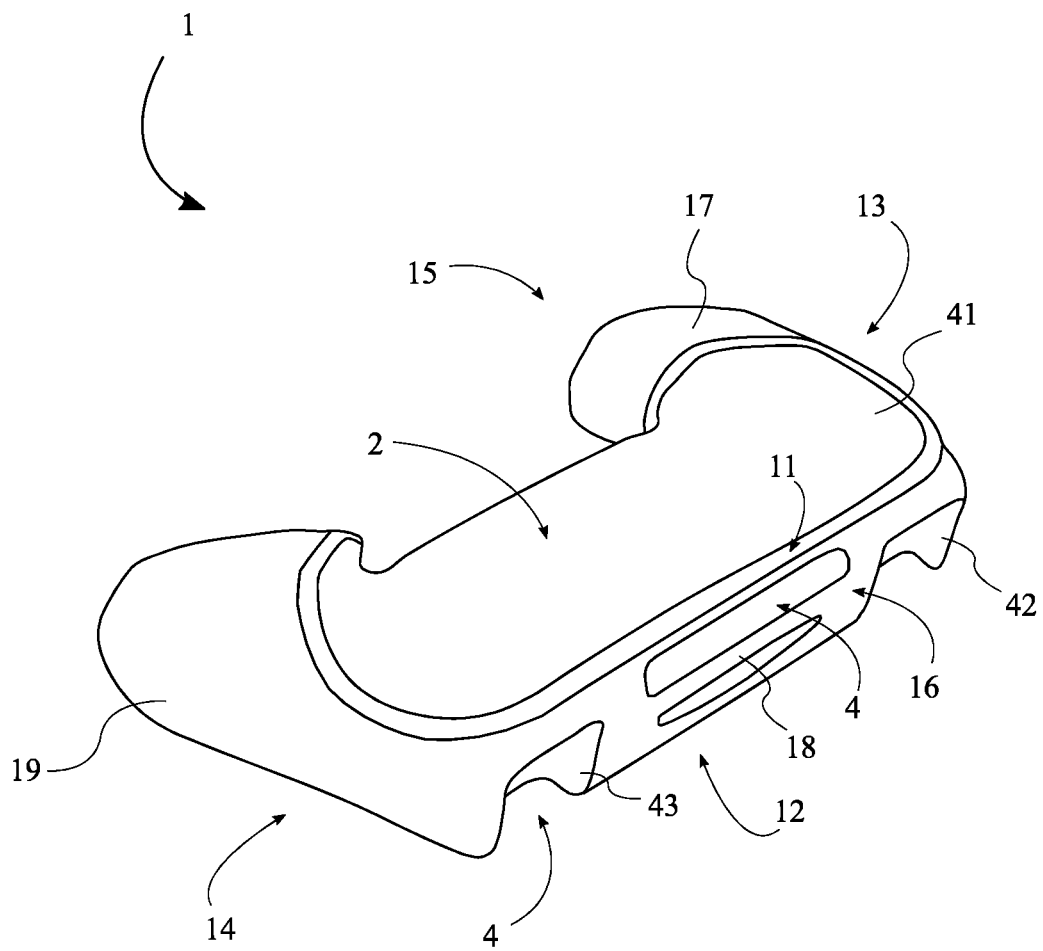
FIG. 2 is a rear perspective view of the present invention in accordance with some embodiments.
Figure 3:
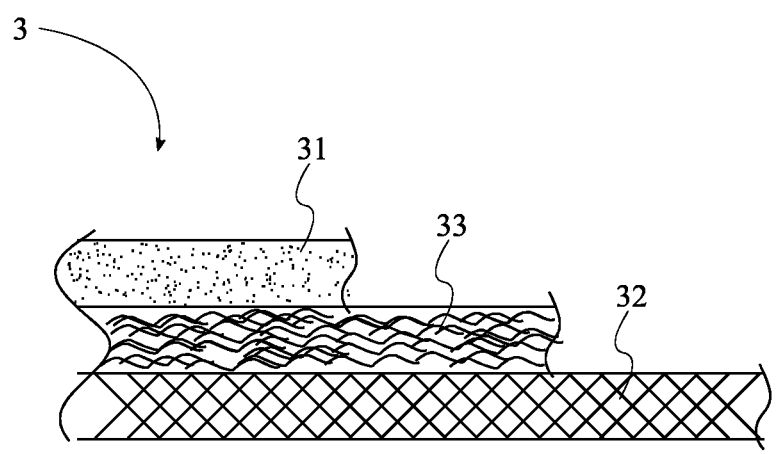
FIG. 3 is a depiction of the series of layers in accordance with some embodiments.

Referring to FIGS. 1-3, in general, the present invention comprises a sleeve body 1 and a controller cavity 2. The sleeve body 1 extends in three dimensions between a top end 11 and a bottom end 12, a left end 13 and a right end 14, and a front end 15 and a back end 16. The top end 11 may be understood to correspond to the main face of the controller comprising any buttons or other interface elements. The bottom end 12 is opposite the top end 11. The back end 16 corresponds to the end of the controller typically facing away from the user during use. The front end 15, therefore, is typically closest to the user. The left 13 and right 14 ends correspond to the sides typically grasped by the user's hands during use.

The controller cavity 2 is delineated by the sleeve body 1 and configured to receive a video game controller of known dimensions. The present invention is intended mainly for use with two-handed controllers such as Xbox or Playstation controllers, though the present invention may be adapted in various embodiments to fit any desired shape and size of controller.

In the preferred embodiment of the present invention, the sleeve body 1 comprises a series of layers 3. Each of the series of layers 3 is made of a flexible material, so that the present invention may flex in order to accommodate and receive the controller. Though certain properties of the series of layers 3 are hereinafter specified, it should be understood that the series of layers 3 may comprise any suitable and relevant material, such as, but not limited to, absorbent fabric, foam, gel, or other materials.

Referring to FIG. 3, the series of layers 3 comprises an outer layer 31 and an inner layer 32. The series of layers 3 is layered adjacent to each other between the outer layer 31 and the inner layer 32. The series of layers 3 may be affixed together through any applicable means, such as, but not limited to, adhesives, stitching, clasps, or other means, though it is contemplated that the preferred method of affixing the series of layers 3 together is through application of adhesive material between layers.

In the preferred embodiment of the present invention, the outer layer 31 is exposed to the environment and comprises a frictional material, providing a frictional outer surface to the user in order to prevent slippage of the user's hands against the controller during use. Furthermore, the outer layer 31 should be permeable to human sweat, and may double as an absorbent layer. If the user's hands sweat during use, the sweat is absorbed into the present invention, removing or reducing any undesired hand slippage against the controller. Alternatively or additionally, the series of layers 3 may comprise an absorbent layer positioned between the outer layer 31 and the inner layer 32.

The inner layer 32 comes into contact with the controller and comprises a waterproof material, so that any sweat, dirt, or other fluids or materials absorbed into the present invention do not penetrate through to the controller, thus protecting the covered surfaces of the controller from stains and undesired buildup of material.

In the preferred embodiment of the present invention, the series of layers 3 further comprises a cushioning layer 33 positioned between the outer layer 31 and the inner layer 32. Preferably, the cushioning layer 33 is made of a gel material. The cushioning layer 33 allows the present invention to compress, providing additional comfort to the user while they play games with the controller.

The general shape of many video game controllers is vaguely rectangular, having a wide central body with two legs or protrusions at the sides to act as handles, providing adequate shape and surface area for the user to grasp the controller. In some embodiments consistent with this geometrical arrangement, the sleeve body 1 comprises a first side portion 17, a medial portion 18, and a second side portion 19. The first side portion 17 is connected adjacent to the medial portion 18, such that the first side portion 17 is positioned adjacent to the left end 13 of the sleeve body 1. More particularly, the first side portion 17 is positioned between the left end 13 and the medial portion 18. Similarly, the second side portion 19 is connected adjacent to the medial portion 18 opposite the first side portion 17, such that the second side portion 19 is positioned adjacent to the right end 14 of the sleeve body 1. More particularly, the second side portion 19 is positioned between the right end 14 and the medial portion 18. Furthermore, in some embodiments, the first side portion 17 and the second side portion 19 are positioned symmetric about the medial portion 18.

In the preferred embodiment, the sleeve body 1 further comprises a plurality of cutouts 4. Moreover, in the preferred embodiment, the plurality of cutouts 4 comprises a face cutout 41, which traverses into the controller cavity 2 through the top end 11. The face cutout 41 exposes the face of the controller, which comprises the majority of any buttons, joysticks, or other interface elements of the controller.

In some embodiments, the plurality of cutouts 4 further comprises a first trigger cutout 42 and a second trigger cutout 43. The first trigger cutout 42 traverses through the back end 16 into the controller cavity 2 adjacent to the first side portion 17 of the sleeve body 1. Similarly, the second trigger cutout 43 traverses through the back end 16 into the controller cavity 2 adjacent to the second side portion 19 of the sleeve body 1. The first trigger cutout 42 and the second trigger cutout 43 accommodate the two trigger-style interface elements commonly found on video game controllers, particularly Xbox and Playstation controllers.

The outer layer 31 of the present invention may be decorated with any desired color, pattern, embellishment, or other visual element. Users may have a wide range of colors, patterns, and visual styles to choose from to suit their preference. In some embodiments, a visual depiction of a pair of cherries may be embossed or debossed onto the first side portion 17 and the second side portion 19 of the sleeve body 1, or elsewhere on the sleeve body 1.

Although the invention has been explained in relation to its preferred embodiment, it is to be understood that many other possible modifications and variations can be made without departing from the spirit and scope of the invention as hereinafter claimed.

What is claimed is:

1. A frictional and sweat absorbent video game controller sleeve comprising:
    a sleeve body;
    a controller cavity;
    the sleeve body extending between a top end and a bottom end, a left end and a right end, and a front end and a back end;
    the controller cavity being delineated by the sleeve body and configured to receive a video game controller;
    the sleeve body comprising a first side portion, a medial portion, a second side portion, a series of layers and a plurality of cutouts;
    the first side portion being adjacently positioned to the left end;
    the second side portion being adjacently positioned to the right end;
    the medial portion being connected in between the first side portion and the second side portion;
    the first side portion and the second side portion being positioned symmetric about the medial portion;
    the series of layers comprising a cushioning layer, an outer layer and an inner layer;
    the series of layers being layered adjacent to each other;
    the cushioning layer being positioned between the outer layer and the inner layer;
    the plurality of cutouts comprising a first trigger cutout, a second trigger cutout and a face cutout;
    the face cutout traversing into the controller cavity through the top end;
    the first trigger cutout traversing through the top end into the controller cavity adjacent to the first side portion;
    the second trigger cutout traversing through the top end into the controller cavity adjacent to the second side portion;
    each of the series of layers comprising a flexible material;
    the cushioning layer comprising a gel material;
    the outer layer comprising an absorbent material and a frictional material; and
    the inner layer comprising a waterproof material.

\* \* \* \* \*